United States Patent [19]

Fleischer et al.

[11] Patent Number: 5,496,917
[45] Date of Patent: Mar. 5, 1996

[54] TWO-STAGE OXIDATION OF POLYARYLENE SULFIDES

[75] Inventors: Dietrich Fleischer, Darmstadt; Heinz Strutz, Usingen; Jürgen Kulpe, Frankfurt am Main; Andreas Schleicher, Einhausen, all of Germany

[73] Assignee: Hoechst Aktiengesellscharf, Germany

[21] Appl. No.: 237,271

[22] Filed: May 3, 1994

[30] Foreign Application Priority Data

May 4, 1993 [DE] Germany ............... 43 14 737.2

[51] Int. Cl.$^6$ ............... C08G 75/00; C08F 6/00
[52] U.S. Cl. ............ 528/373; 528/388; 528/480; 528/483; 528/486; 528/489; 528/503
[58] Field of Search ............ 528/322, 323, 528/388, 480, 491, 486, 487, 489, 373, 503, 483

[56] References Cited

U.S. PATENT DOCUMENTS

| | | | |
|---|---|---|---|
| 3,303,007 | 2/1967 | Mueller et al. | 44/409 |
| 3,303,087 | 2/1967 | Smith | 428/251 |
| 3,326,865 | 6/1967 | Smith | 528/374 |
| 3,948,865 | 4/1976 | Brady et al. | 528/388 |
| 4,563,509 | 1/1986 | Liang | 525/537 |

FOREIGN PATENT DOCUMENTS

| | | |
|---|---|---|
| 0091088 | 10/1983 | European Pat. Off. . |
| 1938806 | 2/1970 | Germany . |
| 1938806 | 9/1971 | Germany . |
| 1234008 | 6/1971 | United Kingdom . |
| 1365486 | 9/1974 | United Kingdom . |

OTHER PUBLICATIONS

Gabler et al, Chimia 28 (1974) pp. 567–575.
Kobunshi Ronbunshu (Japanese Polymer Science and Technology) vol. 37, Nr. 6, 1980, pp. 445–448.
Chemical Abstracts, vol. 80, No. 24, Jun. 17, 1974, Columbus, Ohio, abstract No. 134087u.

*Primary Examiner*—Shelley A. Dodson
*Attorney, Agent, or Firm*—Connolly & Hutz

[57] ABSTRACT

Polyarylene thioethers having recurring units of the formula $$[-(S-E-)_a-(-SO-E-)_b-(SO_2-E)_c-] \quad (I)$$

in which E are, independently of one another, phenylene, naphthylene or biphenylene, a and c have, independently of one another, values from 0 to less than 1 and b has values from greater than zero to less than 1, with the proviso that the sum of a+b+c is equal to 1 and at least two of the indices are greater than zero, are obtained by oxidation of polyarylene sulfides in two stages, wherein in the first stage a polymer in solid form in a suspension medium is oxidized with ozone and the reaction product obtained is in the second stage reacted in acetic acid with hydrogen peroxide in the presence of catalytic amounts of concentrated sulfuric acid and/or with addition of equilibrium per-acids. The polyarylene thioethers are suitable for the production of molded parts having high temperature resistance and high resistance to chemicals.

20 Claims, No Drawings

TWO-STAGE OXIDATION OF POLYARYLENE SULFIDES

The invention relates to the oxidation of polyarylene sulfides in a two-stage process using ozone and hydrogen peroxide as oxidant.

Polyarylene sulfides have been known for some time. Owing to their high heat distortion temperature and their good resistance to chemicals, these polymers are used for components of which high demands are made. However, in some applications the material requirements are higher. Specifically, an increase in the glass transition temperature of the polymers is frequently desirable. This is supposed to be achieved by a polymer-analogous oxidation of polyphenylene sulfide to polyphenylene sulfoxide in acetic acid using concentrated nitric acid for 24 hours at from 0 to +5° C. (U.S. Pat. No. 3,303,007). However, the property values given for the polymer formed indicate that no polymer having a sulfur/oxygen ratio of 1 to 1 was obtained, since the values for the heat distortion temperature have not increased. The term "polymer-analogous" means the conversion of one polymer into another. Disadvantages of the process are firstly the long reaction time required, secondly the possibility of an electrophilic addition and thirdly the acid attack of the strong mineral acid on the thioether bond with long reaction times (degradation reactions).

A method of oxidizing polyarylene sulfides, for example polyphenylene sulfide (PPS), with hydrogen peroxide in concentrated sulfuric acid to the corresponding polyarylene sulfones (PPSSO$_2$) is known (GB-A 1 365 486, DE-A 1 938 806). Here too, disadvantages of the process are the acid attack of the strong mineral acid on the thioether bond, also the possibility of electrophilic addition, the formation of inhomogeneous products and furthermore the aggressive nature of the sulfuric acid.

Besides the use of hydrogen peroxide in concentrated sulfuric acid in the oxidation of polyarylene thioethers, the use of a hydrogen peroxide/acetic acid mixture for oxidizing aromatic polythioethers containing sulfone groups has also been described (Gabler et al., Chimia, 28 (1974), 567). However, these processes are associated with a very high expenditure of time and high temperatures. In addition, only polymers having low molecular weights are used for the preparation.

It is an object of the invention to prepare novel compounds based on polyarylene thioethers which have recurring units such as sulfide/sulfoxide/sulfone units and sulfoxide/sulfone units. It is achieved by a two-stage oxidation process using linear and branched polyarylene thioethers, with the oxidant used being ozone in the first stage and hydrogen peroxide or equilibrium per-acids in the second stage.

The invention accordingly provides polyarylene thioethers having recurring units of the formula

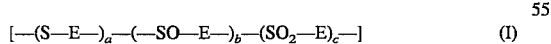

in which E are, independently of one another, phenylene, naphthylene or biphenylene, a and c have, independently of one another, values from 0 to less than 1 and b has values from greater than zero to less than 1, with the proviso that the sum of a+b+c is equal to 1 and at least two of the indices are greater than zero.

Also claimed is the preparation of a compound of the formula (I) by the two-stage oxidation process which comprises oxidizing a polymer in solid form in a suspension medium with ozone in the first stage and in the second stage reacting the reaction product obtained in acetic acid with hydrogen peroxide in the presence of catalytic amounts of concentrated sulfuric acid and/or with the addition of equilibrium per-acid.

Also claimed is the use of the polyarylene compounds of the invention as starting material for the production of molded and functional parts.

The two-stage process of the invention converts the thioether groups of the starting compounds partially or completely into sulfoxide and/or sulfone groups. The divalent sulfide group of the starting compounds is thereby either partially retained or is completely oxidized. The process has made it possible to obtain specific proportions of sulfide/sulfoxide/sulfone in the novel compounds. While in the first stage the sulfide group is converted partially or completely into the sulfoxide group, in the second process stage the use of hydrogen peroxide or equivalent compounds preferentially oxidizes the sulfoxide group to the sulfone group. The proportion of sulfone groups in the resulting compound is dependent on the amount of oxidant used in the second stage. The process of oxidizing polyarylene sulfides with ozone and the compounds prepared therefrom are described in the German Patent Applications P 43 14 736.4, title: "Oxidation of polyarylene sulfides" and P 43 14 735.6, title: "Oxidized polyarylene sulfides" which were filed on May 4, 1993. The process for oxidizing thioether groups with hydrogen peroxide or equilibrium per-acids is described in the German Patent Application P 43 14 738.0, title: "Process for oxidizing polyarylene compounds containing thioether groups" which was likewise filed on May 4, 1993. The specified applications are hereby incorporated by reference.

Starting polymers which can be used are, for example, polyarylene thioethers having recurring units of the formulae (II)—(VI), the syntheses of which are described, for example, in Chimia 18 (1974), 567:

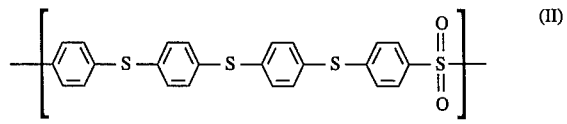

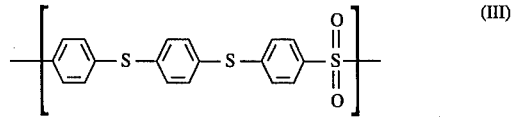

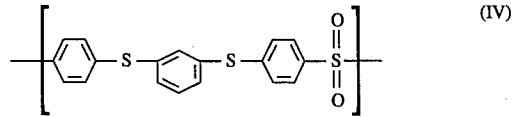

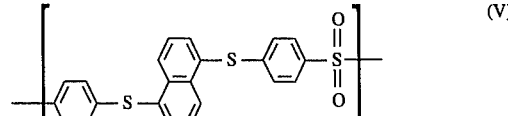

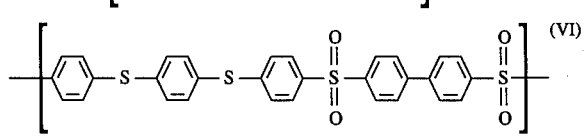

and also polyarylene thioethers having recurring units of the formula (VII), which are described, for example, in U.S. Pat. No. 4,016,145.

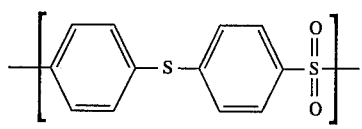

(VII)

The preferred polyarylene thioether is polyphenylene sulfide (PPS) having the recurring unit of the formula (VIII), the preparation process for which is described, for example, in U.S. Pat. Nos. 3,354,129, 3,919,177, 4,038,262 and 4,282,347.

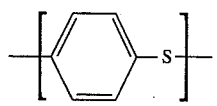

(VIII)

Compounds of the formula VIII are generally 1,4-linked polyarylene sulfides which can have a proportion of up to 30 mol% of a 1,2- and/or 1,3-linkage on the aromatic ring.

Suitable polyarylene thioethers for the invention are generally those having an average molecular weight of from 4,000 to 200,000, preferably from 10,000 to 150,000 in particular from 25,000 to 100,000, determined by GPC.

The particle size of the polymers used generally lies in the range from $5 \times 10^{-6}$ to $500 \times 10^{-6}$ m, preferably from $10 \times 10^{-6}$ to $300 \times 10^{-6}$ m and in particular from $10 \times 10^{-6}$ to $200 \times 10^{-6}$ m.

The reaction temperatures for the oxidation with ozone in the first stage lie in the range from $-10$ to $+80°$ C., preferably from 0 to $50°$ C. The reaction time required depends on the supply of ozone and the selected reactor type and is generally from 1 minute to 2 hours, preferably from 5 to 90 minutes and in particular from 5 to 60 minutes.

However, it is also possible to attain times of less than one minute by optimizing the reaction conditions.

The oxidation in the first stage is carried out in an ozone-containing gas stream in which the ozone is generally present in a concentration of from 0.1 to 9% by volume, preferably from 2 to 6% by volume. Suitable carrier gases for the ozone are oxygen or inert gases such as nitrogen or else mixtures of these. Dried air can likewise be used in the generation of the ozone. The ozone is generally generated by methods known in the art, for example by silent electric discharge.

The reaction is carried out in a reaction vessel whose temperature can be controlled and which is suitable for gassing reactions. This can be, for example, a gassed stirred reactor or a bubble column.

Suitable suspension media are all liquid compounds which are deemed inert under the reaction conditions, for example, water, lower aliphatic alcohols and carboxylic acids each having 1-6, preferably 1-3, carbon atoms in the alkyl group, the esters of the two classes of compounds mentioned above, hydrocarbons having 1-12 carbon atoms, which may be halogenated with chlorine or fluorine, and mixtures of the compounds specified. Mineral acids, for example concentrated sulfuric acid, are also suitable. In protic solvents or solvent mixtures containing protic solvents, the addition of a mineral acid, for example sulfuric acid, can be advantageous.

For example, in methylene chloride complete oxidation to the sulfoxide is achieved in a short time. In contrast, use of lower aliphatic carboxylic acids with an addition of a mineral acid achieves only partial oxidation, since the takeup rate of the ozone drops significantly on reaching a sulfur/oxygen ratio of 1:0.5. Although it is possible to achieve complete oxidation here too, this requires uneconomically long reaction times.

The suspension medium generally dissolves none, or only very small amounts, of the polymer, but it functions as heat and ozone transfer medium and has a controlling influence on the selectivity. Although the reaction can also be carried out in the non-liquid phase, vigorous mixing of the polymer powder then has to be ensured, since otherwise a hot-spot can occur at the point of ozone introduction, which occurrence has a negative effect on the selectivity of oxidation.

In a second stage, the compounds obtained by the reaction with ozone are converted in solid form, for example in acetic acid, either with hydrogen peroxide using catalytic amounts of concentrated sulfuric acid or an initial charge of an equilibrium per-acid to the corresponding compounds of the formula I. The acetic acid used is preferably glacial acetic acid.

The equilibrium per-acid used can be any organic per-acid soluble in acetic acid. Preference is given to using the per-acid form of acetic acid, peracetic acid.

Hydrogen peroxide is generally used in the form of its 30% strength aqueous solution. However, higher percentage strength oxidants of this type can also be used.

If no equilibrium per-acid is used, a catalytic addition of from 0.1 to 10, preferably from 1 to 5% by volume of concentrated sulfuric acid, based on the amount of the acetic acid used, is made.

The reaction in the second stage takes place under the specified conditions at temperatures of from $40°$ to $90°$ C., preferably from $45°$ to $65°$ C. The associated reaction time is from 0.5 to 12 hours, from 1 to 4 hours being preferred. To be certain of decomposing possible residues of peroxide compound, at the end of the reaction the reaction mixture can be heated for a short time to temperatures above $90°$ C., for example up to the boiling point of the reaction mixture.

The polyarylene compounds obtained according to the invention can be either thermoplastically processed or can be further processed, for example, by customary sintering processes. This is dependent on the melting points of the polyarylene compounds obtained. The first group can be converted into molded and functional parts by the processing methods customary for thermoplastics, for example injection molding or extrusion. The molding compositions can also contain known pulverulent fillers such as chalk, talc, clay, mica, and/or fibrous reinforcements such as glass fibers and carbon fibers, whiskers, and further customary additives and processing aids, for example lubricants, mold release agents, antioxidants, UV stabilizers. Such parts are used as highly stressable functional components, for example in aircraft and automobile construction and in the construction of chemical apparatus.

The second group, i.e. the polymers which can be processed by sintering processes, is used in functional parts having a high temperature and chemical resistance.

In the examples, $T_g$ is the glass transition temperature, $T_m$ is the melting point.

EXAMPLES

1) Polyphenylene sulfoxide (PPSO)

54.1 g of a polyphenylene sulfide (PPS) powder (MW 40,000) having an average particle diameter of $20 \times 10^{-6}$ m were suspended in 400 ml of methylene chloride in a reaction vessel fitted with a disk stirrer. Ozone-containing gas was passed into the suspension at temperatures of from $-5°$ to $-7°$ C. until 0.5 mol of ozone had been absorbed (72 minutes). The ozone concentration during gassing was from 51 to 115 grams per cubic meter of carrier gas. After the reaction the polymer powder was filtered off with suction and dried. Only the exclusive formation of sulfoxide groups could be observed in the infrared spectrum. $T_g$:240° C., $T_m$:≧370° C. (decomposition).

Elemental analysis: $C_6H_4SO$ C 58.04 H 3.25 S 25.82 O 12.89 (calc.) C 58.3 H 3.5 S 25.45 O 12.75 (found)

The sulfur/oxygen ratio of the polymer obtained was 1:1.

2) Polyphenylene sulfide sulfoxide (PPS/SO)

216 g of a PPS powder as in Example 1 were suspended in a mixture of 850 ml of glacial acetic acid and 8.5 ml of sulfuric acid in a bubble column (5 cm in diameter, 120 cm in length), the temperature of which could be controlled. At from 10° to 20° C., the suspension was gassed via a glass frit with an ozone-containing gas stream (flow rate 180–200 l/h) having a concentration of from 50 to 100 gram of ozone per cubic meter of gas. After 80 minutes the reaction was stopped after absorption of 48 g of ozone because a significant drop in the reaction rate had become apparent at this point in time. Subsequently the polymer powder was filtered off, washed a number of times with small amounts of water and then dried at 30 mbar and 50°–100° C.

Only sulfoxide groups could be recognized in the IR spectrum.

The sulfur/oxygen ratio in the polymer obtained was 1:0.51.

3) Polyphenylene sulfide sulfone (PPS/SO$_2$)

5.81 g of polyphenylene sulfide sulfoxide prepared in accordance with Example 2 were suspended in 50 ml of glacial acetic acid which contained 0.13 ml of concentrated sulfuric acid. After addition of 0.98 g of hydrogen peroxide (87% strength by weight) at 25° C., the temperature rose to 34° C. The suspension was then stirred for 3½ hours at 65° C. Subsequently the polymer powder was filtered off with suction, washed with water and dried overnight at 20 mbar and 100° C. Yield: 6.1 g =98% of theory.

In the IR spectrum, the sulfoxide group vibrations have disappeared, only one strong vibration at 1170 cm$^{-1}$ can be observed, which is attributable to the sulfone group. The sulfur/oxygen ratio has increased from 1:0.51 to 1:0.97.

We claim:

1. A polyarylene thioether having recurring units of the formula

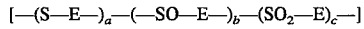   (I)

in which E are, independently of one another, phenylene, naphthylene or biphenylene, a and c have, independently of one another, values from 0 to less than 1 and b has values from greater than zero to less than 1, with the proviso that the sum of a+b+c is equal to 1 and at least two of the indices are greater than zero.

2. A process for oxidizing polyarylene sulfides in two stages, which comprises oxidizing a polymer in solid form in a suspension medium with ozone in the first stage and in the second stage reacting the reaction product obtained in acetic acid with hydrogen peroxide in the presence of catalytic amounts of concentrated sulfuric acid and/or with the addition of equilibrium per-acids.

3. The process as claimed in claim 2, wherein the suspension medium used in the first stage is a mineral acid, an aliphatic alcohol, an aliphatic carboxylic acid each having 1–6 carbon atoms in the alkyl radical, a carboxylic ester of these compounds, halogenated or non-halogenated hydrocarbons having 1–12 carbon atoms or a mixture of the specified compounds.

4. The process as claimed in claim 2, wherein in the first stage the reaction temperatures are from −10° C. to +80° C. and the reaction times are up to 2 hours.

5. The process as claimed in claim 2, wherein the equilibrium per-acid is peracetic acid.

6. The process as claimed in claim 2, wherein the concentration of sulfuric acid in the second stage is from 0.1 to 10% by volume, based on the acetic acid.

7. The process as claimed in claim 2, wherein the reaction temperature in the second stage is in the range from 40° to 90° C. and the reaction time is from 0.5 to 12 hours.

8. The process as claimed in claim 2, wherein the acetic acid used is concentrated acetic acid.

9. The process as claimed in claim 2, wherein the polyarylene thioether used has recurring units of the formulae:

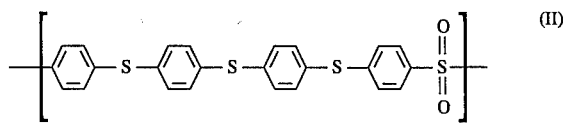   (II)

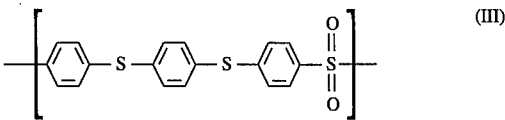   (III)

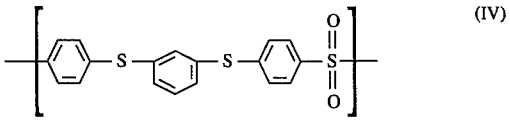   (IV)

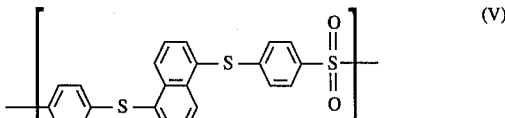   (V)

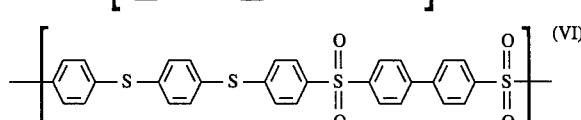   (VI)

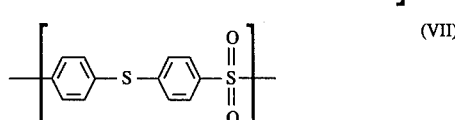   (VII)

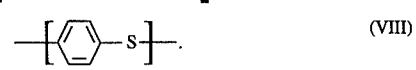   (VIII)

10. The process as claimed in claim 2, wherein the polyphenylene thioether used has an average molecular weight of from 4,000 to 200,000, as determined by GPC and an average particle size of from 5×10$^{-6}$ to 500×10$^{-6}$ m.

11. A molded or functional part produced from the polyarylene compound as claimed in claim 1.

12. The process as claimed in claim 10, wherein the polyphenylene thioether used has an average molecular weight of from 10,000 to 150,000, as determined by GPC and an average particle size of from 10×10$^{-6}$ to 300×10$^{-6}$ m.

13. The process as claimed in claim 10, wherein the polyphenylene thioether used has an average molecular weight of from 25,000 to 100,000, as determined by GPC and an average particle size of from 10×10$^{-6}$ to 200×10$^{-6}$ m.

14. The process as claimed in claim 7, wherein in the first stage the reaction temperatures are from 0° to 50° C. and the reaction times are from 5 to 90 minutes.

15. The process as claimed in claim 14, wherein the reaction time is from 5 to 60 minutes.

16. The process as claimed in claim 2, wherein the first stage is carried out in an ozone-containing gas stream in which the ozone is present in a concentration of from 0.1 to 9% by volume.

17. The process as claimed in claim 16, wherein the ozone is present from 2 to 6% by volume.

18. The process as claimed in claim 2, wherein the acetic acid used is glacial acetic acid.

19. The process as claimed in claim 6, wherein the concentration of sulfuric acid in the second stage is 1 to 5% by volume based on the acidic acid.

20. The process as claimed in claim 7, wherein the reaction temperature in the second stage is in the range from 45° to 65° C. and the reaction time is from 1 to 4 hours.

* * * * *